Jan. 3, 1928. 1,654,853
A. F. ANDERSON
LIQUID MEASURING DEVICE
Filed Aug. 21, 1924
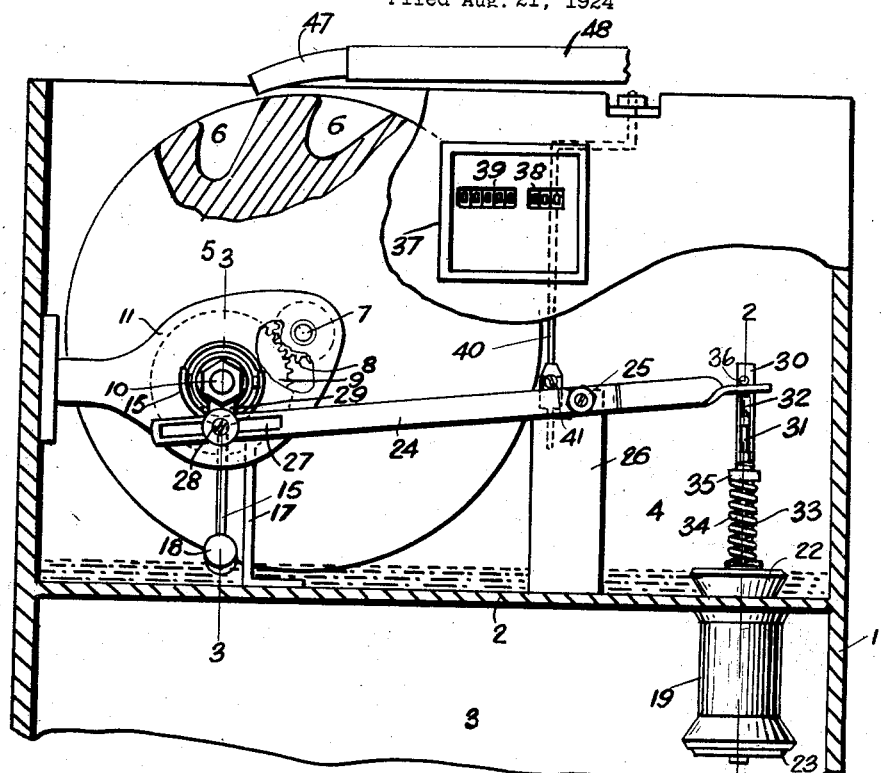
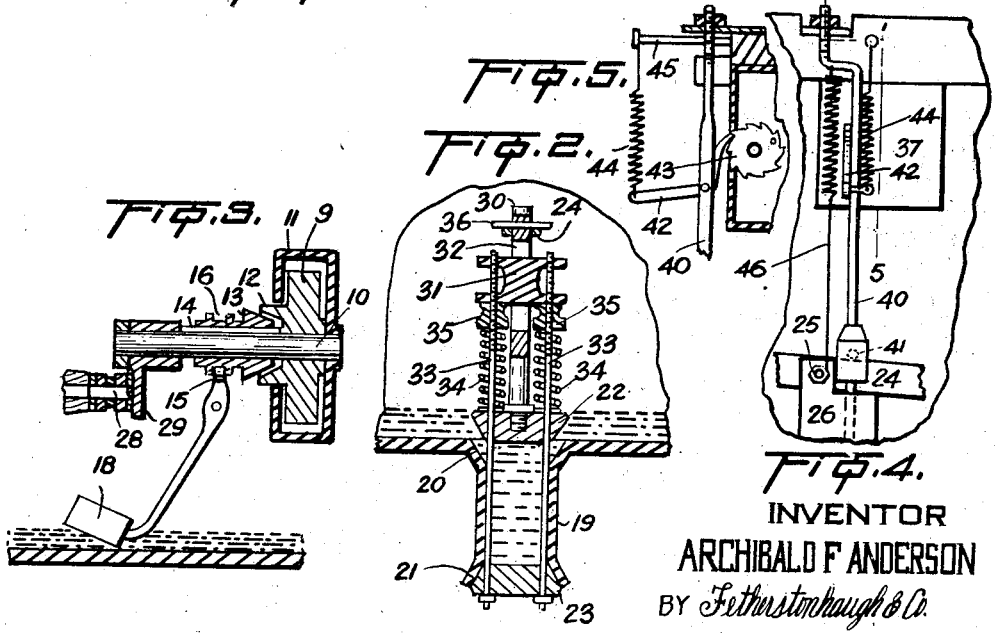
INVENTOR
ARCHIBALD F ANDERSON
BY Fetherstonhaugh & Co.
ATTYS.

Patented Jan. 3, 1928.

1,654,853

UNITED STATES PATENT OFFICE.

ARCHIBALD FRANKLIN ANDERSON, OF GALT, ONTARIO, CANADA.

LIQUID-MEASURING DEVICE.

Application filed August 21, 1924. Serial No. 733,425.

My invention relates to improvements in liquid measuring devices and the object of the invention is to devise means for measuring liquids, particularly gasoline as it flows from the tank wagon into the tank of the dealer or service station.

A further object is to devise means for utilizing the pressure of the gasoline as it flows from the tank wagon by gravity to operate the measuring mechanism.

A still further object is to devise means for periodically entrapping a predetermined quantity of gasoline and subsequently releasing it into the dealer's tank.

Another object is to devise means for recording on an indicator the quantity of gasoline periodically released into the tank from the measuring device.

My invention consists of a measuring device constructed and arranged all as hereinafter more particularly described and illustrated in the accompanying drawing in which:

Fig. 1 represents a vertical section.

Fig. 2 is a vertical cross section through the measuring chamber and valve gear employed in connection therewith, such section being taken on the line 2—2 Figure 1.

Fig. 3 is a vertical cross section through the driving mechanism for the measuring device showing the float operated clutch, taken on the line 3—3 Figure 1.

Fig. 4 is a rear elevation through the means for operating the indicating mechanism, and Fig. 5 is a vertical section through the upper portion thereof taken on the line 5—5 Figure 4.

Like characters of reference indicate corresponding parts in the different views.

1 is the casing of the measuring device having a horizontal partition 2 disposed intermediately of the height thereof dividing the casing into a lower tank communicating chamber 3 and an upper tank chamber 4.

5 is a wheel having on its periphery a series of inwardly extending pockets 6, said wheel being of much the same construction and operating on the same principle as certain water wheels. The wheel 5 is secured on the shaft 7 which carries a pinion 8 meshing with the gear 9 rotatably mounted on the crank shaft 10, said gear 9 and pinion 8 being enclosed in the gear casing 11 through which the shafts 7 and 10 extend.

The gear 9 is provided with a female clutch member 12 adapted to receive the male clutch member 13 slidably mounted on the shaft 10, the feather 14 preventing rotation of the male clutch member 13 relatively to such shaft. 15 is a clutch fork extending into the circumferential slot 16 in the male clutch member 13, said fork pivoted on the bracket 17. The free end of the fork 15 is provided with a float 18 which is adapted to extend down in the liquid in the tank chamber 4.

19 is a chamber of predetermined capacity, being of one gallon, two gallon or five gallon as desired, such chamber being open at both ends and its upper end preferably lying flush with the upper surface of the partition 2 and bevelled valve seats 20 and 21 being constituted in the chamber 19 in the vicinity of its upper and lower end respectively, upon which the truncated conical valves 22 and 23 are adapted to seat.

24 is an oscillating beam pivoted intermediately of its length by the pin 25 on the upwardly extending bracket 26, its longer end having a slot 27 which receives the crank pin 28 of the crank 29 which is secured to the shaft 10. The shorter end of the beam 24 receives the vertical valve spindle 30 which is secured to the valve 22. A transversely extending yoke 31 sliding freely in the slot 32 in the valve stem 30 is connected by means of downwardly extending rods 33 with the lower valve 23, spiral springs 34 being disposed between the lock washers 35 on the rods 33 and the valve 22, such rods 33 extending freely through the valve 22, thus centering such valve during its actuation.

36 is a pin extending through the valve stem 30 in the vicinity of its upper end adapted to engage the beam 24 as it moves upwardly.

37 is an indicator for indicating the number of gallons passing through the device, the right hand window 38 indicating the amount of each delivery and the left hand window 39 indicating the total amount monthly or annually as desired, the right hand reading being provided with tripping mechanism for resetting at any time.

The construction of the indicator forms no part of the present invention and consequently is not illustrated or described, many such devices being on the market which can be readily applied to the present invention.

40 is a vertical slide member provided with a transversely extending pin 41 adapted to engage the top of the beam 24 immediately to the left of its fulcrum so that upward movement of the longer end of the beam 24 will cause the slide to be moved upwardly and thus cause the pawl 42 which is pivoted to the slide 40 in the vicinity of its upper end to engage the actuating wheel 43 of the indicator 37, said pawl 42 being spring-held against said wheel 43 by means of the spring 44 which is secured at its lower end to the pawl and at its upper end to the bracket 45. The slide 40 is spring-held in engagement with the beam 24 by means of the spring 46 which is secured at its upper end to the slide and at its lower end to the bracket 26.

47 is a nozzle adapted to be positioned in alignment with the pockets 6 in the wheel 5, said nozzle 47 being connected to the hose 48 of the tank wagon.

The device operates as follows:

The hose 48 of the tank wagon is connected to the nozzle 47 and as the gasoline flows out of the wagon through the hose and nozzle 47 the gasoline is projected into the pockets 6, thus turning the wheel 5. During this period and until the gasoline in the tank chamber 4 reaches the required level the male clutch member 13 is disengaged from the female clutch member 12 and thus the wheel 5 driving the pinion 8 and intermeshing gear 9 is imparting no motion to the oscillating beam 24 as the gear 9 is rotating on the shaft 10, such shaft being stationary. As the level of the gasoline in the tank chamber 4 rises to the required height the float 18 swings the fork 15 toward the gear 9, thus throwing the male clutch member 13 into engagement with the female member 12 which will cause the shaft 10 to rotate, thus rotating the attached crank 29, consequently oscillating the beam 24. As the lower end of the beam 24 is depressed by the crank and the shorter end correspondingly raised, such shorter end engages the pin 46 on the valve stem 30, thus raising the valve 22 off its seat as illustrated in Figure 2 and allowing the liquid in the tank chamber 4 to flow into the chamber 19 until it is full.

During this operation the valve 23 is closed, thus holding the liquid in such chamber 19. During upward movement of the valve 22 the springs 34 are compressed as the valve 22 slides upwardly on the rods 33.

As the crank 29 is swung about its horizontal centre line the shorter end of the beam is depressed and the longer end elevated. As the shorter end is depressed it engages the yoke 31 and forces it downwardly and as the rods 33 are connected to the yoke and to the valve 23 the latter is opened, allowing the measured quantity of gasoline in the chamber 19 to be released into the dealer's tank or other reservoir connected with the chamber 3.

There is sufficient play between the pin 36 for the upper edge of the yoke 31 to allow the shorter end of the beam 24 sufficient freedom of movement to permit the valve 22 to seat on the valve seat 20 prior to the valve 23 being depressed off its seat 21. Thus at no time will both valves 22 and 23 be off their seats.

As the valve 23 is opened, dispelling the gasoline into the chamber 3 the longer end of the beam 24 is moved upwardly and as it engages the pin 41 the slide 40 is raised, lifting the pawl 42 which actuates the wheel 43, causing the indicator 37 to give a fresh reading either in gallons or five gallons, depending upon the capacity of the chamber 19.

From the above description it will be seen that I have devised a simple and effective measuring device for indicating the amount of gasoline delivered from a tank wagon into the dealer's or service station tank. The absence of such a measuring device has in the past meant a considerable loss to dealers and service men. The public is protected by various measuring devices to indicate the amount of gasoline delivered into the tanks of motor cars, but the dealer has usually no means of knowing what gasoline is delivered to him, other than the capacity of the tank wagon which may or may not be full. With my device the dealer can be certain that he only pays for the amount of gasoline he has received from the gasoline company.

The clutch on the shaft 10 prevents the device actuating until the required height of gasoline is in the tank chamber 4 and thus prevents inaccuracies that might otherwise occur. The device may be placed in any desired place in the garage or service station or over the dealer's tank as long as it is sufficiently low to allow the gasoline to flow from the tank wagon through the nozzle 47 onto the wheel 5.

Although I have described my device as particularly applicable for measuring gasoline delivered from the tank wagon to dealers' tanks it is to be understood that it could with equal facility be applied to other purposes for measuring liquid, either gasoline, oil, water or the like.

What I claim as my invention is:

1. In liquid measuring devices, a liquid receiving tank, a liquid measuring tank communicating therewith, inlet and outlet valves for the measuring tank, a wheel journalled in the liquid receiving tank and driven by the liquid entering the tank impinging thereon, a nozzle through which the liquid to be fed into the liquid receiving tank is designed to flow, said nozzle causing the liquid flowing therefrom to impinge on the wheel, and means connected with the wheel and with the valves for alternately operating them to admit liquid to the measuring tank from the liquid receiving tank and to release the liquid from the measuring tank.

2. In liquid measuring devices, a liquid receiving tank, a liquid measuring tank communicating therewith, inlet and outlet valves for the measuring tank, a wheel journalled in the liquid receiving tank and driven by the liquid entering the tank impinging thereon, a nozzle through which the liquid to be fed into the liquid receiving tank is designed to flow, said nozzle causing the liquid flowing therefrom to impinge on the wheel, a crank connected to the wheel, an oscillating beam slidably connected to the crank at one end and its other end connected to the valves for alternately operating them to admit liquid to the measuring tank from the liquid receiving tank and to release the liquid from the measuring tank.

3. In liquid measuring devices, a liquid receiving tank, a liquid measuring tank communicating therewith, inlet and outlet valves for the measuring tank, a wheel journalled in the liquid receiving tank and driven by the liquid entering the tank impinging thereon, a nozzle through which the liquid to be fed into the liquid receiving tank is designed to flow, said nozzle causing the liquid flowing therefrom to impinge on the wheel, a crank connected to the wheel, an oscillating beam slidably connected to the crank at one end and its other end connected to the valves for alternately operating them to admit liquid to the measuring tank from the liquid receiving tank and to release the liquid from the measuring tank, a progressive indicator for indicating each measured quantity of liquid released from the measuring tank, and means for actuating the indicator from the oscillating beam.

4. In a liquid measuring device, a liquid receiving tank, a liquid measuring tank communicating therewith, means for directing liquid into the said receiving tank, valve means for entrapping in the measuring tank the liquid therein received from the receiving tank, valve-actuating means, an operative connection between the valve-actuating means and the said valve means, said valve actuating means being arranged within the said receiving tank and so constructed and adapted as to be actuated by the flow of the liquid entering the receiving tank, a clutch in the operative connection between the valve actuating means and the valve means, and means for throwing in the clutch only when the liquid in the receiving tank reaches a predetermined level.

5. In a liquid measuring device, a receiving tank, a measuring tank communicating therewith, inlet and outlet valves for the measuring tank, a rotatable shaft journalled in said receiving tank, a wheel fixed on said shaft, a nozzle through which liquid is supplied to the receiving tank, said nozzle being arranged with respect to the said wheel to cause the liquid to impinge and rotate the wheel, valve-actuating means for alternately operating the valves to admit liquid to the measuring tank from the receiving tank and to subsequently release the liquid from the measuring tank, an operative connection between the said wheel and the said valve-actuating means including a clutch normally inactive, and float-controlled means operating to place the clutch in active position only when the liquid in the receiving tank reaches a predetermined level.

6. In a liquid measuring device, a receiving tank, a measuring tank communicating therewith, inlet and outlet valves for the measuring tank, a wheel journalled in the receiving tank, a nozzle through which the liquid to be fed into the receiving tank is designed to flow, said nozzle causing the liquid flowing therefrom to impinge on the wheel to rotate the latter, a crank shaft, an oscillating beam having one end slidably connected to the crank of the shaft and its other end connected to the valves for alternately operating them to admit liquid to the measuring tank from the receiving tank and to release the liquid from the measuring tank, and a driving connection between the said wheel and the said crank shaft including reduction gearing.

7. In a liquid measuring device, a receiving tank, a measuring tank communicating therewith, inlet and outlet valves for the measuring tank, a wheel journalled in the receiving tank, a nozzle through which the liquid to be fed into the receiving tank is designed to flow, said nozzle causing the liquid flowing therefrom to impinge on the wheel for rotating same, a crank shaft, an oscillating beam having one end slidably connected to the crank of the shaft and its other end connected to the valves for alternately operating them to admit liquid to the measuring tank from the receiving tank and to subsequently release the liquid from the measuring tank, a driving connection between the wheel and the crank shaft including a reducing gear loosely supported on the crank shaft, clutch means for connecting the said loose gear in driving relation with the said shaft, and float-controlled clutch-actuating means operating to move the clutch into active position when the liquid in the receiving tank reaches a predetermined level.

8. In a liquid measuring device, a receiving tank, a measuring tank communicating therewith, inlet and outlet valves for the measuring tank, a shaft journalled in the receiving tank, a wheel fixedly mounted on said shaft, a nozzle through which the liquid to be fed into the receiving tank flows, said nozzle being so positioned as to cause the liquid flowing therefrom to impinge the wheel to rotate the same, a pinion secured to the shaft, a second shaft journalled in the receiving tank, a gear mounted to rotate freely on the second shaft and meshing with the said pinion, a clutch member on the said gear, a co-acting clutch member slidably supported on the said second shaft, means for alternately operating the valves to admit liquid into the measuring tank from the receiving tank and to subsequently release the liquid from the measuring tank, said means being connected with the said second shaft to be operated upon rotation of said shaft, and float-controlled means connected with the said coacting clutch member and operating to slide the said member into and out of engagement with the other clutch member as the level of the liquid in the receiving tank increases and decreases with respect to a predetermined limit.

ARCHIBALD FRANKLIN ANDERSON.